(12) United States Patent
Zhang et al.

(10) Patent No.: US 9,203,614 B2
(45) Date of Patent: Dec. 1, 2015

(54) METHOD, APPARATUS, AND SYSTEM FOR PROTECTING CLOUD DATA SECURITY

(71) Applicant: HUAWEI TECHNOLOGIES CO., LTD., Shenzhen, Guangdong (CN)

(72) Inventors: Jingbin Zhang, Shenzhen (CN); Chengdong He, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 14/141,849

(22) Filed: Dec. 27, 2013

(65) Prior Publication Data
US 2014/0126723 A1    May 8, 2014

Related U.S. Application Data

(63) Continuation of application No. PCT/CN2011/081987, filed on Nov. 9, 2011.

(51) Int. Cl.
*H04L 29/06* (2006.01)
*H04L 9/08* (2006.01)
*H04L 9/14* (2006.01)

(52) U.S. Cl.
CPC ............ *H04L 9/083* (2013.01); *H04L 9/0822* (2013.01); *H04L 9/0825* (2013.01); *H04L 9/14* (2013.01); *H04L 63/0471* (2013.01)

(58) Field of Classification Search
CPC ...... H04L 9/083; H04L 9/0822; H04L 9/0825
USPC .................................................. 380/279, 278
See application file for complete search history.

(56) References Cited

U.S. PATENT DOCUMENTS

| | | |
|---|---|---|
| 6,885,748 B1 | 4/2005 | Wang |
| 6,915,434 B1 * | 7/2005 | Kuroda et al. ............... 713/193 |
| 7,068,787 B1 | 6/2006 | Ta et al. |

(Continued)

FOREIGN PATENT DOCUMENTS

| | | |
|---|---|---|
| CN | 102014133 A | 4/2011 |
| CN | 102055760 A | 5/2011 |

(Continued)

OTHER PUBLICATIONS

Long, "Efficient Chosen-ciphertext secure certificateless threshold key encapsulation mechanism", Dec. 11, 2009, Information Sciences, p. 1167-1181.*

(Continued)

*Primary Examiner* — Kenneth Chang
*Assistant Examiner* — Gregory Lane
(74) *Attorney, Agent, or Firm* — Huawei Technologies Co., Ltd.

(57) ABSTRACT

The present invention relates to a method, an apparatus, and a system for protecting cloud data security. A key management center encrypts original data M sent by a first terminal using a key K, and uploads encrypted data C1 to a cloud server. When the key management center receives a request from a second terminal for the data M, it generates encrypted data C2, which is generated by first encrypting C1 with a key Kb of the second terminal and then decrypted by the key K that was used to encrypt the original data M to generate C1. The key management center then sends the encrypted data C2 to the second terminal. The second terminal decrypts the encrypted data C2 using its own key Kb to obtain the original data M.

6 Claims, 9 Drawing Sheets

(56) References Cited

U.S. PATENT DOCUMENTS

| | | | |
|---|---|---|---|
| 8,855,317 B2* | 10/2014 | Rong et al. | 380/278 |
| 2003/0056118 A1* | 3/2003 | Troyansky et al. | 713/201 |
| 2006/0112213 A1* | 5/2006 | Suzuoki et al. | 711/100 |
| 2009/0100349 A1* | 4/2009 | Hancock | 715/751 |
| 2009/0132813 A1* | 5/2009 | Schibuk | 713/158 |
| 2009/0313463 A1 | 12/2009 | Pang et al. | |
| 2010/0094900 A1 | 4/2010 | Hughes, Jr. | |
| 2010/0211782 A1 | 8/2010 | Auradkar et al. | |
| 2011/0107105 A1 | 5/2011 | Hada | |
| 2011/0142230 A1 | 6/2011 | Zuili | |
| 2011/0197059 A1 | 8/2011 | Klein et al. | |

FOREIGN PATENT DOCUMENTS

| | | |
|---|---|---|
| CN | 102176709 A | 9/2011 |
| CN | 102187312 A | 9/2011 |

OTHER PUBLICATIONS

Mohamed Nabeel et al:"Towards privacy preserving access control in the cloud", XP032106375, Oct. 15, 2011, total 10 pages.

* cited by examiner

METHOD, APPARATUS, AND SYSTEM FOR PROTECTING CLOUD DATA SECURITY

This application is a continuation of International Application No. PCT/CN2011/081987, filed on Nov. 9, 2011, which is hereby incorporated by reference in its entireties.

TECHNICAL FIELD

The present invention relates to the field of IT technologies, and in particular to a method, an apparatus, and a system for protecting cloud data security.

BACKGROUND

In the cloud computing field, user data stored at a cloud end (a cloud server) is called cloud data. A user loses direct control of data when storing the data at the cloud end and data security cannot be ensured. An important measure to protect data security is to encrypt the data.

In the prior art, terminal A encrypts data and uploads the encrypted data to a cloud server. Another terminal, such as terminal B, requests a key from terminal A after loading the encrypted data from the cloud server and after obtaining the key, uses the key to decrypt the encrypted data.

By analyzing the prior art, the inventor finds the prior art has at least the following problem:

In the prior art, another terminal, such as terminal B, may request obtaining of a key that terminal A encrypts data. When this method is used, if the key is not properly protected, it is possible that key leakage occurs, so that data sharing is not secure.

SUMMARY

An invention purpose of embodiments of the present invention is to provide a method, an apparatus, and a system for protecting cloud data security, so that a key of cloud data may not be leaked during a process where another terminal acquires the cloud data.

A method for protecting cloud data security provided in an embodiment of the present invention includes:

receiving, by a key management center, original data M sent by a first terminal;

encrypting, by the key management center, the original data M according to a key K generated by the key management center, so as to obtain encrypted data C1;

uploading, by the key management center, the encrypted data C1 to a cloud server for storage; and when receiving a request for decrypting data or a request for downloading data sent by a second terminal, obtaining, by the key management center, encrypted data C2 and sending the encrypted data C2 to the second terminal, so that the second terminal decrypts the encrypted data C2 according to a key owned by the second terminal, so as to obtain the original data M, where the encrypted data C2 is obtained by processing the encrypted data C1.

Another method for protecting cloud data security provided in an embodiment of the present invention includes:

sending, by a second terminal, a request for decrypting data or a request for downloading data to a key management center;

receiving, by the second terminal, encrypted data C2 sent by the key management center, where the encrypted data C2 is obtained by processing encrypted data C1, the encrypted data C1 is data stored in a cloud server, and the encrypted data C1 is obtained after the key management center encrypts, according to a key K generated by the key management center, original data M sent by a first terminal; and decrypting, by the second terminal, the encrypted data C2 according to a key owned by the second terminal, so as to obtain the original data M.

A key management center provided in an embodiment of the present invention includes:

a receiving unit, configured to receive original data M sent by a first terminal and receive a request for decrypting data or a request for downloading data sent by a second terminal;

an encrypting unit, configured to encrypt, according to a key K generated by the key management center, the original data M received by the receiving unit, so as to obtain encrypted data C1;

a sending unit, configured to upload the encrypted data C1 obtained by the encrypting unit to a cloud server for storage; and an obtaining unit, configured to obtain encrypted data C2 when the receiving unit receives the request for decrypting data or the request for downloading data sent by the second terminal, where the encrypted data C2 is obtained by processing the encrypted data C1, and the sending unit is further configured to send the encrypted data C2 obtained by the obtaining unit to the second terminal, so that the second terminal decrypts the encrypted data C2 according to a key owned by the second terminal, so as to obtain the original data M.

A terminal provided in an embodiment of the present invention includes:

a sending unit, configured to send a request for decrypting data or a request for downloading data to a key management center;

a receiving unit, configured to receive encrypted data C2 sent by the key management center, where the encrypted data C2 is obtained by processing encrypted data C1, the encrypted data C1 is data stored in a cloud server, and the encrypted data C1 is obtained after the key management center encrypts, according to a key K generated by the key management center, original data M sent by a first terminal; and a decrypting unit, configured to decrypt, according to a key owned by the terminal, the encrypted data C2 received by the receiving unit, so as to obtain the original data M.

A system for protecting cloud data security provided in an embodiment of the present invention includes:

a second terminal, configured to, after sending a request for decrypting data or a request for downloading data to a key management center, receive encrypted data C2 sent by the key management center and decrypt the encrypted data C2 according to a key owned by the second terminal, so as to obtain original data M of a first terminal; and the key management center, configured to, when receiving the request for decrypting data or the request for downloading data sent by the second terminal, obtain the encrypted data C2 and send the encrypted data C2 to the second terminal, where the encrypted data C2 is obtained by processing encrypted data C1, the encrypted data C1 is stored in a cloud server, and the encrypted data is obtained after the key management center encrypts, according to a key K generated by the key management center, the original data M sent by the first terminal.

With the method, the apparatus, and the system for protecting cloud data security provided in the embodiments of the present invention, a key management center encrypts original data M and stores, in the key management center, a key for encrypting the original data M; and when receiving a request for decrypting data or a request for downloading data sent by a second terminal, the key management center does not directly provide an encryption key of encrypted data C1 stored in a cloud server for the second terminal but sends encrypted data C2 that is obtained by processing the encrypted data C1 to the second terminal. The method may not only ensure that the second terminal can obtain the original data M finally according to a key owned by the second terminal, but also ensure that a key of the encrypted data C1 stored in the cloud server may not be leaked during a process where the second terminal acquires cloud data, thereby reducing a risk of key leakage and enhancing security of data sharing.

DESCRIPTION OF EMBODIMENTS

The following clearly describes the technical solutions in the embodiments of the present invention with reference to the accompanying drawings in the embodiments of the present invention.

Figure 1:
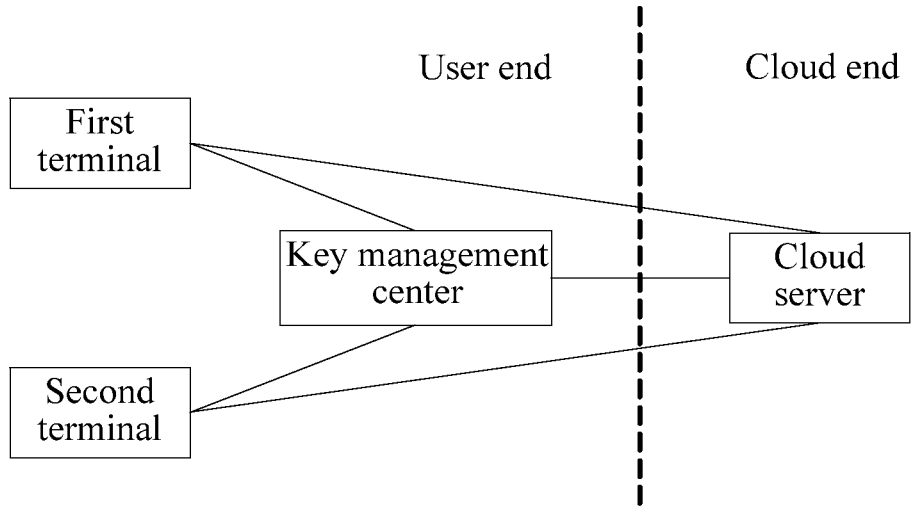
FIG. 1 is a diagram of a networking architecture for protecting cloud data security according to an embodiment of the present invention.

FIG. 1 is a diagram of a networking architecture for protecting cloud data security according to an embodiment of the present invention. It can be known from FIG. 1 that, a key management center locates at a user end. When a first terminal uploads data, the key management center is responsible for encrypting the data and uploading the encrypted data to a cloud server for storage; when the data is downloaded, the key management center is responsible for processing the obtained encrypted data and sending the processed data to a second terminal, so that the second terminal can decrypt the processed data according to a key owned by the second terminal, so as to obtain original data.

A manner for forming the key management center includes but is not limited to any one of the following:

Manner 1: The key management center is formed by one or more servers.

Manner 2: The key management center is formed by one or more terminals.

Manner 3: The key management center is formed by one or more servers and one or more terminals.

Figure 2:
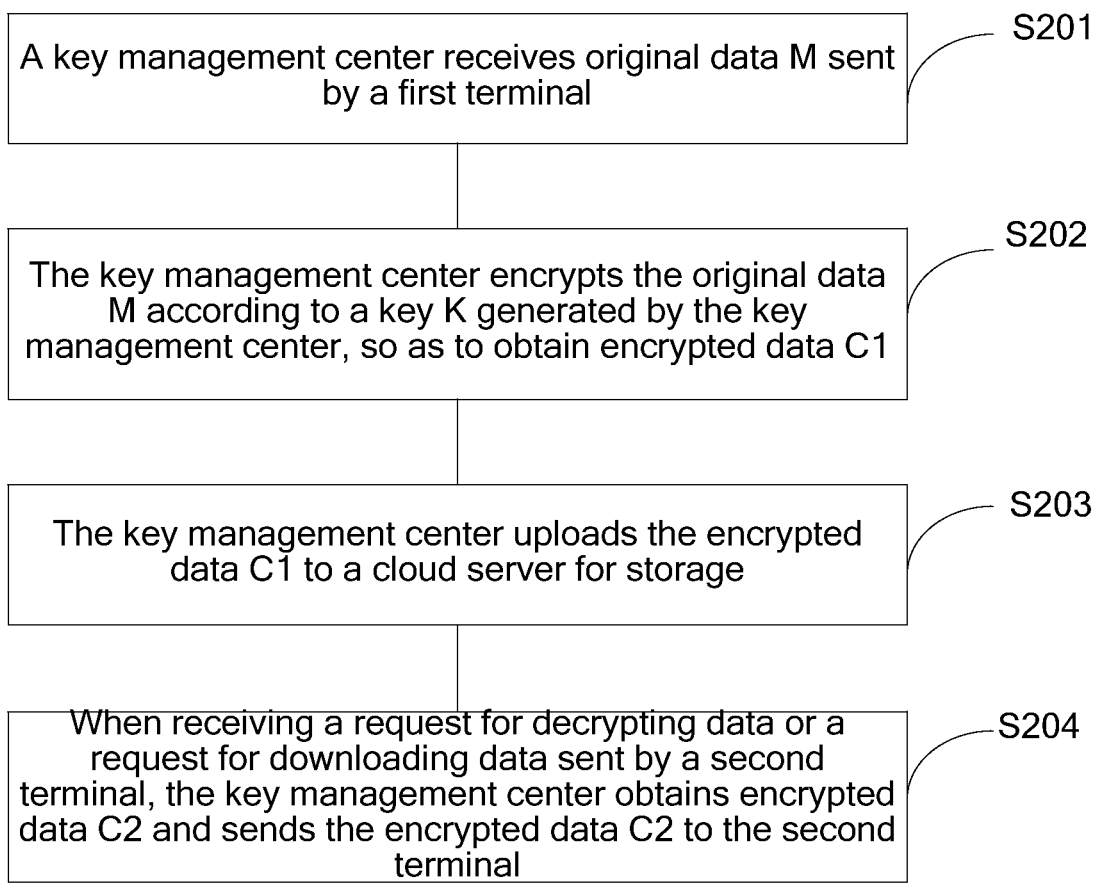
FIG. 2 shows a method for protecting cloud data security under the networking architecture shown in FIG. 1 according to an embodiment of the present invention.

FIG. 2 shows a method for protecting cloud data security under the networking architecture shown in FIG. 1 according to an embodiment of the present invention. The method includes:

S201: A key management center receives original data M sent by a first terminal.

S202: The key management center encrypts the original data M according to a key K generated by the key management center, so as to obtain encrypted data C1.

It should be noted that the key K is generated and stored by the key management center and the key management center does not send the key K to any terminal, including the first terminal, thereby ensuring that the key K of the encrypted data is secure.

S203: The key management center uploads the encrypted data C1 to a cloud server for storage.

S204: When receiving a request for decrypting data or a request for downloading data sent by a second terminal, the key management center obtains encrypted data C2 and sends the encrypted data C2 to the second terminal, so that the second terminal decrypts the encrypted data C2 according to a key owned by the second terminal, so as to obtain the original data M, where the encrypted data C2 is obtained by processing the encrypted data C1.

A manner for the key management center to obtain the encrypted data C2 provided in this embodiment of the present invention may include any one of the following manners:

Manner 1: When receiving a request for decrypting the encrypted data C1, or a request for downloading the original data M, or a request for downloading the encrypted data C1 sent by the second terminal, the key management center obtains the encrypted data C1, firstly encrypts the encrypted data C1 to obtain first intermediate encrypted data C1', and then decrypts the first intermediate encrypted data C1' to obtain the encrypted data C2.

Manner 2: When receiving a request for decrypting second intermediate encrypted data C1" sent by the second terminal, the key management center decrypts the second intermediate encrypted data C1" to obtain the encrypted data C2, where the second intermediate encrypted data C1" is obtained after the second terminal encrypts the encrypted data C1.

Manner 3: When receiving a request for decrypting the encrypted data C1, a request for downloading the original data M, or a request for downloading the encrypted data C1 sent by the second terminal, the key management center obtains the encrypted data C1, firstly decrypts the encrypted data C1 according to the key K to obtain the original data M, and then encrypts the original data M to obtain the encrypted data C2.

It should be noted that original data in this embodiment of the present invention is named as M, encrypted data is named as C1 and C2, and a key is named as K. The foregoing names are exemplary names made for clear description in this embodiment of the present invention. Those skilled in the art may definitely name the original data, the encrypted data, and the key in other forms. Therefore, a naming manner used in this embodiment does not impose a limitation on the present invention and so does not in the following embodiments.

With the method, the apparatus, and the system for protecting cloud data security provided in the embodiments of the present invention, a key management center encrypts original data M and stores, in the key management center, a key for encrypting the original data M; and when receiving a request for decrypting data or a request for downloading data sent by a second terminal, the key management center does not directly provide an encryption key of encrypted data C1 stored in a cloud server for the second terminal but sends encrypted data C2 that is obtained by processing the encrypted data C1 to the second terminal. The method may not only ensure that the second terminal can obtain the original data M finally according to a key owned by the second terminal, but also ensure that a key of the encrypted data C1 stored in the cloud server may not be leaked during a process where the second terminal acquires cloud data, thereby reducing a risk of key leakage and enhancing security of data sharing.

Figure 3:
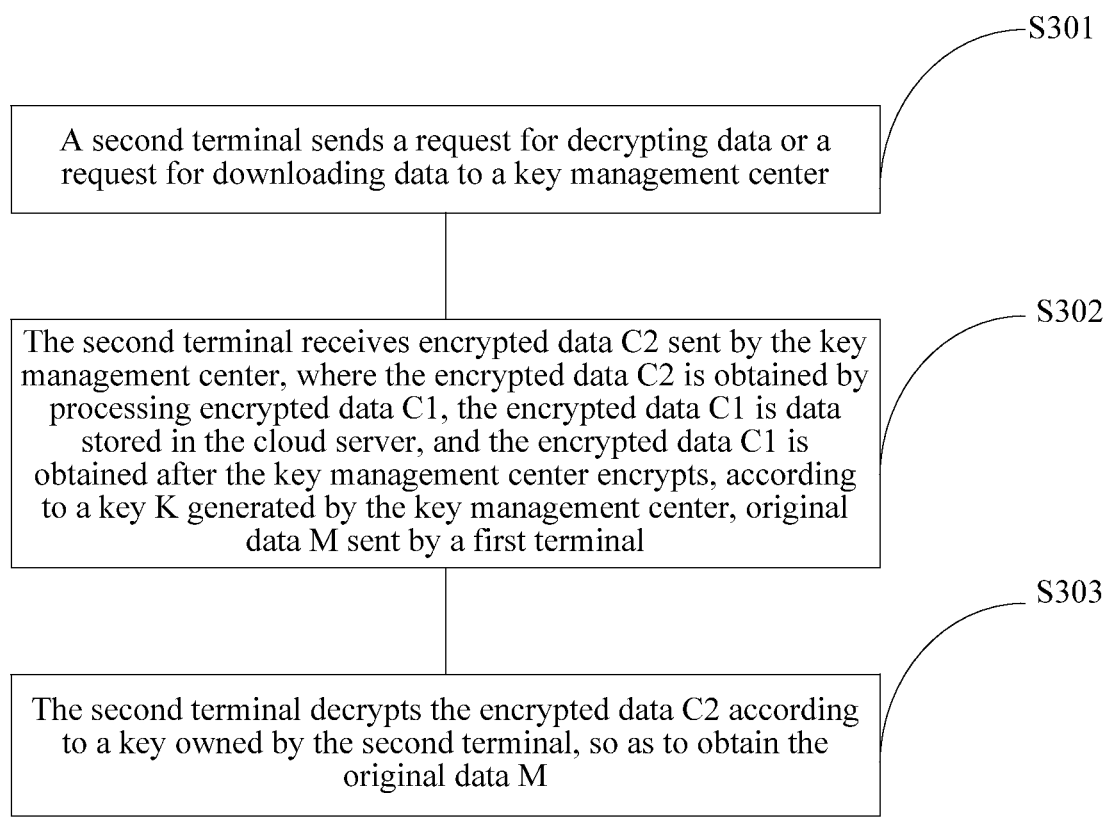
FIG. 3 shows another method for protecting cloud data security under the networking architecture shown in FIG. 1 according to an embodiment of the present invention.

FIG. 3 shows another method for protecting cloud data security under the networking architecture shown in FIG. 1 according to an embodiment of the present invention. The method includes:

S301: A second terminal sends a request for decrypting data or a request for downloading data to a key management center.

If the second terminal needs to acquire data of a first terminal that is stored in a cloud server, the second terminal may firstly acquire encrypted data C1 from the cloud server and then request the key management center to decrypt the data, or may directly request downloading of original data M or encrypted data C1 from the key management center. A specific implementation manner may include any one of the following:

Manner 1: The second terminal sends a request for decrypting the encrypted data C1 to the key management center after acquiring the encrypted data C1 from the cloud server.

Manner 2: The second terminal sends a request for downloading the original data M or a request for downloading the encrypted data C1 to the key management center.

Manner 3: After acquiring the encrypted data C1 from the cloud server, the second terminal encrypts the encrypted data to obtain second intermediate encrypted data C1" and then sends a request for decrypting the second intermediate encrypted data C" to the key management center.

S302: The second terminal receives encrypted data C2 sent by the key management center, where the encrypted data C2 is obtained by processing the encrypted data C1, the encrypted data C1 is data stored in the cloud server, and the encrypted data C1 is obtained after the key management center encrypts, according to a key K generated by the key management center, the original data M sent by the first terminal.

A specific implementation manner in this embodiment may be as follows: If the key management center receives the request for decrypting the encrypted data C1, the request for downloading the original data M, or the request for downloading the encrypted data C1 sent by the second terminal, the key management center obtains the encrypted data C1 according to the received request, and performs decryption after encryption processing or performs encryption after decryption processing on the encrypted data C1, so as to obtain the encrypted data C2; or if the key management center receives the request for decrypting the second intermediate encrypted data C1" sent by the second terminal, the key management center decrypts the second intermediate encrypted data C1", so as to obtain the encrypted data C2.

The foregoing descriptions are only some specific implementation manners provided in this embodiment. Those skilled in the art may also use other implementation manners to process the encrypted data C1 to obtain the encrypted data C, such as a manner described in the embodiment shown in FIG. 2

S303: The second terminal decrypts the encrypted data C2 according to a key owned by the second terminal, so as to obtain the original data M.

With the method for protecting cloud data security provided in this embodiment of the present invention, a second terminal does not directly acquire an encryption key of encrypted data C1 stored in a cloud server but obtains encrypted data C2 that is obtained by processing the encrypted data C1. The method may not only ensure that the second terminal can decrypt the encrypted data C2 according to a key owned by the second terminal, so as to obtain original data M; but also ensure that a key of the encrypted data C1 stored in the cloud server may not be leaked during a process where the second terminal acquires encrypted data, thereby reducing a risk of key leakage and enhancing security of data sharing.

Figure 4:
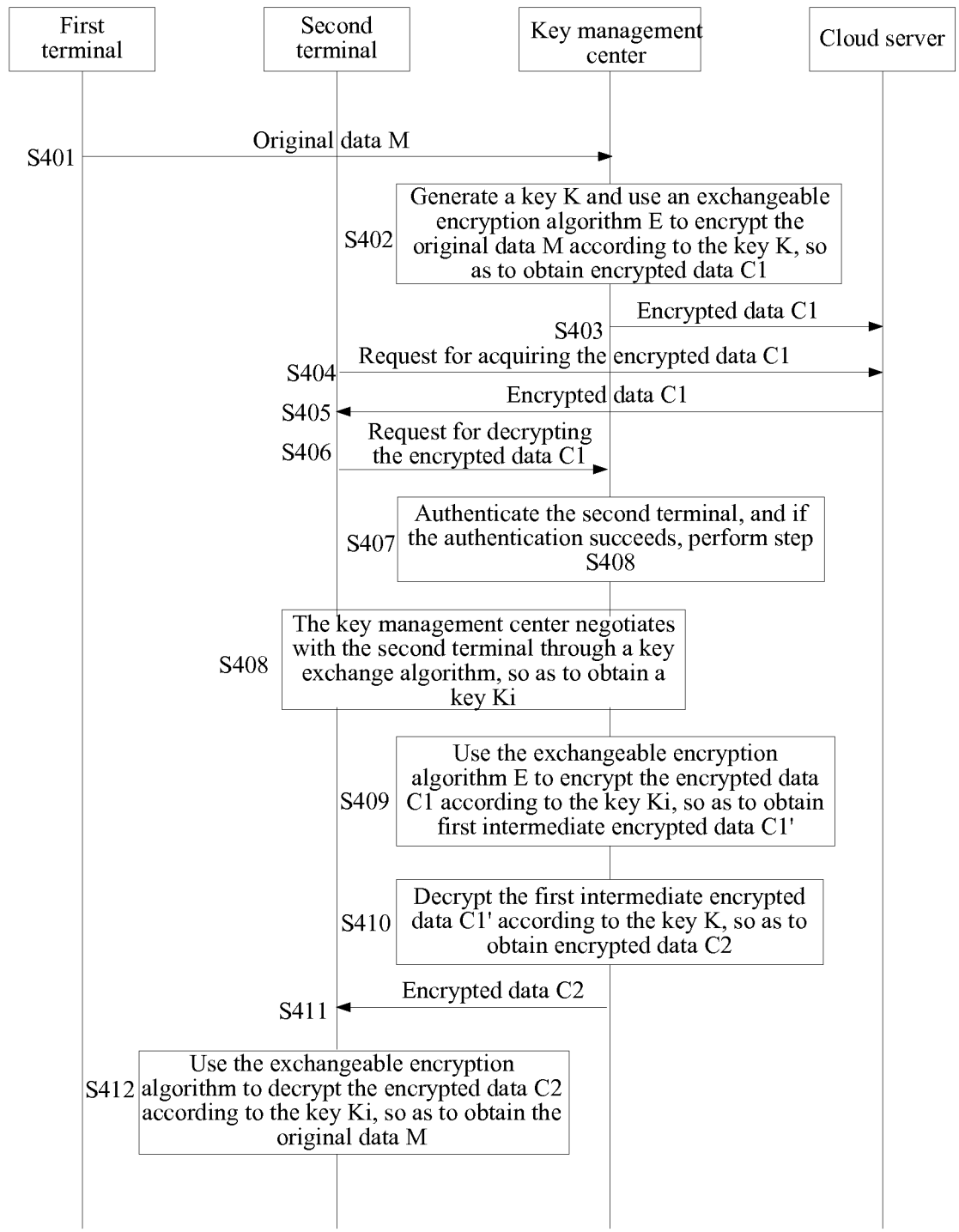
FIG. 4 is an implementation flowchart of a third method embodiment under the networking architecture shown in FIG. 1 according to an embodiment of the present invention.

FIG. 4 is an implementation flowchart of a third method embodiment under the networking architecture shown in FIG. 1 according to an embodiment of the present invention. This embodiment includes:

S401: A key management center receives original data M sent by a first terminal.

S402: The key management center uses an exchangeable encryption algorithm E to encrypt the original data M according to a key K generated by the key management center, so as to obtain encrypted data C1, that is, C1=E(K,M).

It should be noted that the key K is generated and stored by the key management center and the key management center does not send the key K to any terminal, including the first terminal, thereby ensuring that the key of the encrypted data is secure.

The exchangeable encryption algorithm has the following property:

E(K1,E(K2,Q))=E(K2,E(K1,Q)), and a result of encryption by using the exchangeable algorithm has no relation with a sequence for using a key. Specifically, a result that firstly a key K1 is used to encrypt data Q to obtain encrypted data Q1 and then a key K2 is used to encrypt the encrypted data Q1 is the same as a result that firstly the key K2 is used to encrypt the data Q to obtain encrypted data Q2 and then the key K1 is used to encrypt the encrypted data Q2, that is, the result of encryption by using the exchangeable algorithm has no relation with the sequence for using a key.

Similarly, when N different keys are used to encrypt the data Q, $A_N^N = N*(N-1)* \ldots *2*1$ different combinations exist, and results of encryption according to each combination are the same.

It should be noted that, when the exchangeable encryption algorithm is used to encrypt data, a key for decrypting an encryption result is the same as a key for encryption.

S403: The key management center uploads the encrypted data C1 to a cloud server for storage.

S404: When a second terminal needs to obtain the original data M, the second terminal sends a request for acquiring the encrypted data C1 to the cloud server, so as to request downloading of the encrypted data C1.

S405: The second terminal receives the encrypted data C1 returned by the cloud server.

It should be noted that the second terminal may also acquire the encrypted data C1 by using the following manner:

sending, by the second terminal, a request for acquiring the encrypted data C1 to the key management center, and after the key management center downloads the encrypted data C1 from the cloud server according to the request for acquiring the encrypted data C1, receiving the encrypted data C1 sent by the key management center.

S406: The second terminal sends a request for decrypting data to the key management center, where in this embodiment, the request for decrypting data is a request for decrypting the encrypted data C1, and the key management center obtains the encrypted data C1.

A manner for the key management center to obtain the encrypted data C1 provided in this embodiment of the present invention may include any one of the following manners:

Manner 1: The request for decrypting the encrypted data C1 carries the encrypted data C1, and the key management center directly acquires the encrypted data C1 carried in the request for decrypting the encrypted data C1 sent by the second terminal.

Manner 2: The request for decrypting the encrypted data C1 does not carry the encrypted data C1, and the key management center receives the request for decrypting the encrypted data C1 sent by the second terminal, and sends an instruction for acquiring the encrypted data C1 to the second terminal, so as to instruct the second terminal to send the encrypted data C1 to the key management center.

Definitely, when the request for decrypting the encrypted data C1 does not carry the encrypted data C1, after receiving the request for decrypting the encrypted data C1, the key management center may also make a request for acquiring the encrypted data C1 to the cloud server, which is not described herein in further detail in this embodiment.

S407: The key management center authenticates the second terminal, and if the authentication succeeds, performs step S408.

S408: The key management center negotiates with the second terminal through a key exchange algorithm, so as to obtain a key Ki.

S409: The key management center uses the exchangeable encryption algorithm E to encrypt the encrypted data C1 according to the key Ki, so as to obtain first intermediate encrypted data C1', that is, $C1'=E(Ki,C1)$.

Because $C1=E(K,M)$, it can be seen from a property of the exchangeable encryption algorithm, the first intermediate encrypted data $C1'=E(Ki,E(K,M))=E(K,E(Ki,M))$.

In this embodiment, the exchangeable encryption algorithm for encrypting the encrypted data C1 to obtain the first intermediate encrypted data C1' is negotiated with the second terminal in advance.

S410: The key management center decrypts the first intermediate encrypted data C1' according to the key K, so as to obtain encrypted data C2, that is, $C2=E(Ki,M)$.

S411: The key management center sends the encrypted data C2 to the second terminal.

S412: The second terminal decrypts the encrypted data C2 according to a key owned by the second terminal, so as to obtain the original data M, where in this embodiment, the second terminal uses the exchangeable encryption algorithm to decrypt the encrypted data C2 according to the key Ki owned by the second terminal, so as to obtain the original data M.

In the third method embodiment provided in the embodiment of the present invention, a key management center encrypts original data M and stores, in the key management center, a key for encrypting the original data M; and when receiving a request for decrypting data or a request for downloading data sent by a second terminal, the key management center does not directly provide an encryption key of encrypted data C1 stored in a cloud server for the second terminal but sends encrypted data C2 that is obtained by processing the encrypted data C1 to the second terminal. The method may not only ensure that the second terminal can obtain the original data M finally according to a key owned by the second terminal, but also ensure that a key of the encrypted data C1 stored in the cloud server may not be leaked during a process where the second terminal acquires cloud data, thereby reducing a risk of key leakage and enhancing security of data sharing. Secondly, during a process where the second terminal requests acquiring of the original data M, the key management center firstly encrypts the obtained encrypted data C1 and then decrypts an encryption result according to a property of an exchangeable encryption algorithm. In this way, data is encrypted during an entire transmission and processing process, thereby enhancing security of data sharing.

Figure 5:
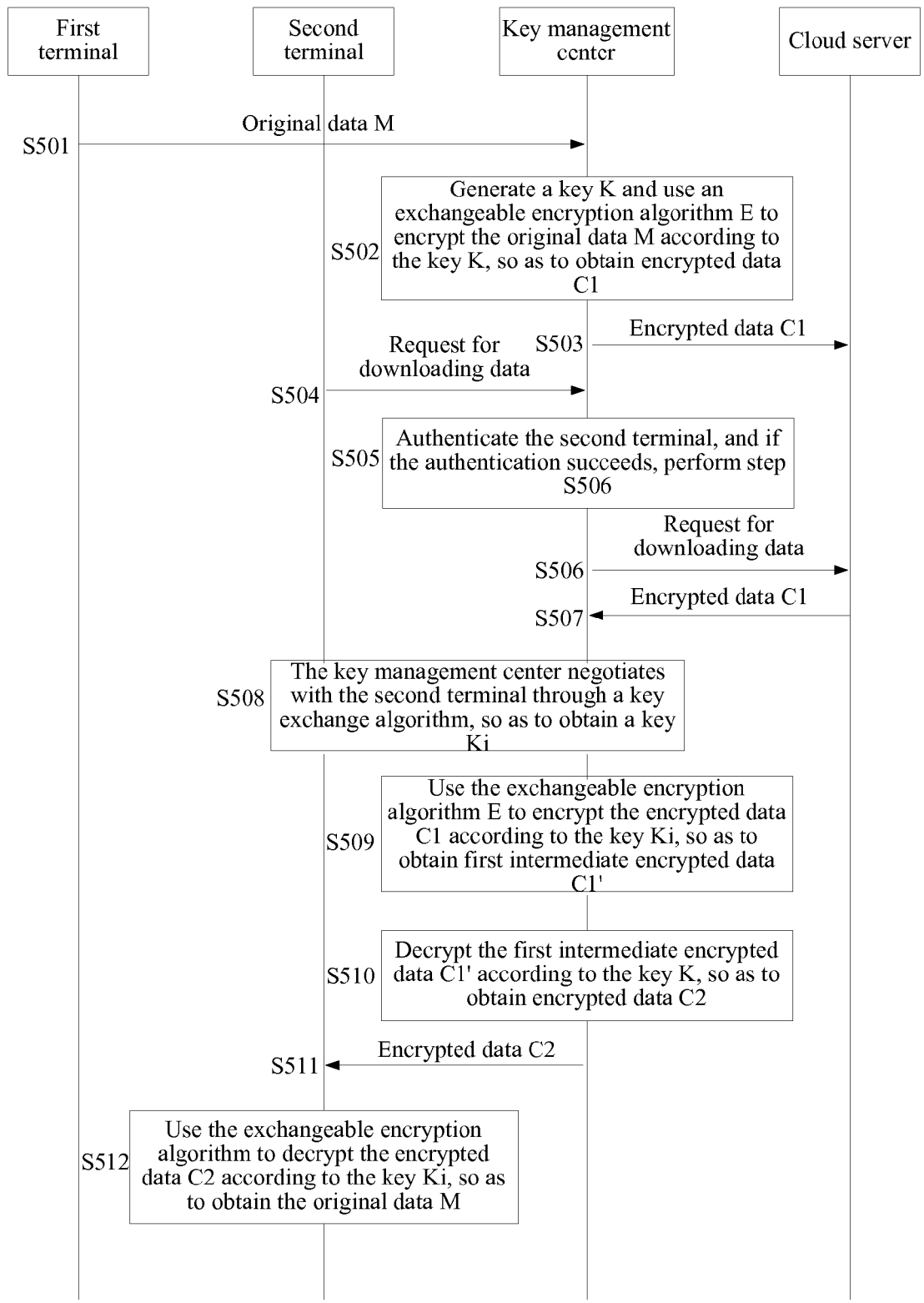
FIG. 5 is an implementation flowchart of a fourth method embodiment under the networking architecture shown in FIG. 1 according to an embodiment of the present invention.

FIG. 5 is an implementation flowchart of a fourth method embodiment under the networking architecture shown in FIG. 1 according to an embodiment of the present invention. This embodiment includes:

S501: A key management center receives original data M sent by a first terminal.

S502: The key management center uses an exchangeable encryption algorithm E to encrypt the original data M according to a key K generated by the key management center, so as to obtain encrypted data C1, that is, $C1=E(K,M)$.

It should be noted that the key K is generated and stored by the key management center and the key management center does not send the key K to any terminal, including the first terminal, thereby ensuring that the key of the encrypted data is secure.

S503: The key management center uploads the encrypted data C1 to a cloud server for storage.

S504: When a second terminal needs to acquire the original data M, the second terminal sends a request for downloading data to the key management center, where in this embodiment, the request for downloading data includes a request for downloading the original data M or a request for downloading the encrypted data C1.

S505: The key management center authenticates the second terminal, and if the authentication succeeds, performs step S506.

S506: The key management center forwards the request for downloading data to the cloud server.

In this embodiment, the key management center may also constructs a new downloading request according to the request for downloading data sent by the second terminal, and sends the new downloading request to the cloud server.

S507: The key management center receives the encrypted data C1 returned by the cloud server, so as to obtain the encrypted data C1.

S508: The key management center negotiates with the second terminal through a key exchange algorithm, so as to obtain a key Ki.

It should be noted that step S508 may also be performed before step S505.

S509: The key management center uses the exchangeable encryption algorithm E to encrypt the encrypted data C1 according to the key Ki, so as to obtain first intermediate encrypted data C1', that is, $C1'=E(Ki,C1)$.

Because $C1=E(K,M)$, it can be seen from a property of the exchangeable encryption algorithm, the first intermediate encrypted data $C1'=E(Ki,E(K,M))=E(K,E(Ki,M))$.

In this embodiment, the exchangeable encryption algorithm for encrypting the encrypted data C1 to obtain the first intermediate encrypted data C1' is negotiated with the second terminal in advance.

S510: The key management center decrypts the first intermediate encrypted data C1' according to the key K, so as to obtain encrypted data C2, that is, C2=E(Ki,M).

S511: The key management center sends the encrypted data C2 to the second terminal.

S512: The second terminal decrypts the encrypted data C2 according to a key owned by the second terminal, so as to obtain the original data M, where in this embodiment, the second terminal uses the exchangeable encryption algorithm to decrypt the encrypted data C2 according to the key Ki owned by the second terminal, so as to obtain the original data M.

In the fourth method embodiment provided in the embodiment of the present invention, a key management center encrypts original data M and stores, in the key management center, a key for encrypting the original data M; and when receiving a request for decrypting data or a request for downloading data sent by a second terminal, the key management center does not directly provide an encryption key of encrypted data C1 stored in a cloud server for the second terminal but sends encrypted data C2 that is obtained by processing the encrypted data C1 to the second terminal. The method may not only ensure that the second terminal can obtain the original data M finally according to a key owned by the second terminal, but also ensure that a key of the encrypted data C1 stored in the cloud server may not be leaked during a process where the second terminal acquires cloud data, thereby reducing a risk of key leakage and enhancing security of data sharing. Secondly, during a process where the second terminal requests acquiring of the original data M, the key management center firstly encrypts the obtained encrypted data C1 and then decrypts an encryption result according to a property of an exchangeable encryption algorithm. In this way, data is encrypted during an entire transmission and processing process, thereby enhancing security of data sharing.

Figure 6:
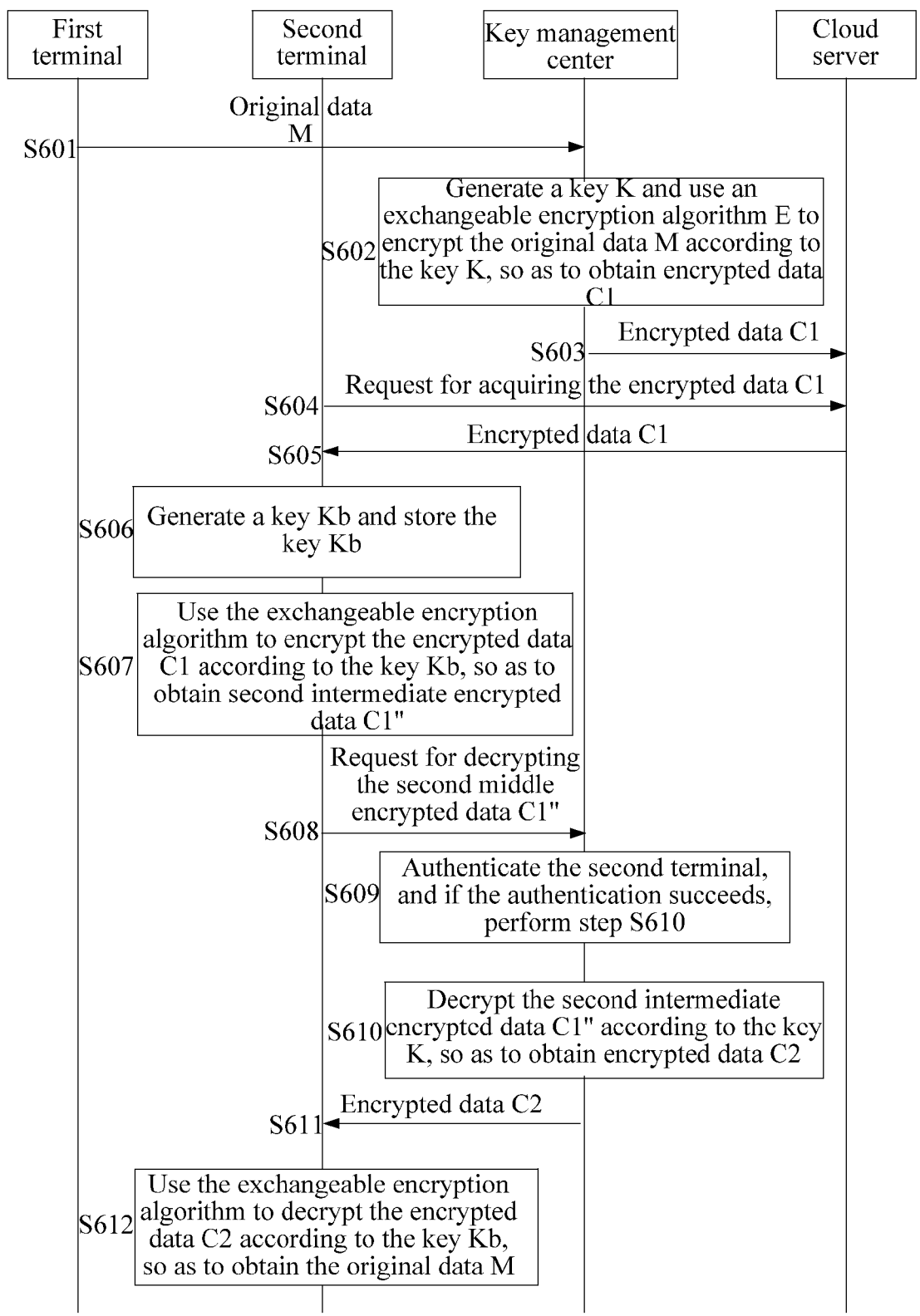
FIG. 6 is an implementation flowchart of a fifth method embodiment under the networking architecture shown in FIG. 1 according to an embodiment of the present invention.

FIG. 6 is an implementation flowchart of a fifth method embodiment under the networking architecture shown in FIG. 1 according to an embodiment of the present invention. This embodiment includes:

S601: A key management center receives original data M sent by a first terminal.

S602: The key management center uses an exchangeable encryption algorithm E to encrypt the original data M according to a key K generated by the key management center, so as to obtain encrypted data C1, that is, C1=E(K,M).

It should be noted that the key K is generated and stored by the key management center and the key management center does not send the key K to any terminal, including the first terminal, thereby ensuring that the key of the encrypted data is secure.

S603: The key management center uploads the encrypted data C1 to a cloud server for storage.

S604: When a second terminal needs to obtain the original data M, the second terminal sends a request for acquiring the encrypted data C1 to the cloud server, so as to request acquiring of the encrypted data C1.

S605: The second terminal receives the encrypted data C1 returned by the cloud server, so as to obtain the encrypted data C1.

It should be noted that the second terminal may also acquire the encrypted data C1 by using the following manner:

sending, by the second terminal, a request for acquiring the encrypted data C1 to the key management center, and after the key management center downloads the encrypted data C1 from the cloud server according to the request for acquiring the encrypted data C1, receiving the encrypted data C1 sent by the key management center.

S606: The second terminal generates a key Kb and stores the key Kb.

S607: The second terminal uses the exchangeable encryption algorithm to encrypt the encrypted data C1 according to the key Kb, so as to obtain second intermediate encrypted data C1".

Because C1=E(K,M), it can be seen from a property of the exchangeable encryption algorithm, the second intermediate encrypted data C1"=E(Kb,C1)=E(Kb,E(K,M))=E(K,E(Kb,M)).

In this embodiment, the exchangeable encryption algorithm for encrypting the encrypted data C1 to obtain the second intermediate encrypted data C1" is negotiated with the second terminal in advance.

S608: The second terminal sends a request for decrypting data to the key management center, where in this embodiment, the request for decrypting data is a request for decrypting the second intermediate encrypted data C1", and the key management center obtains the second intermediate encrypted data C1".

A method for the key management center to obtain the second intermediate encrypted data C1" provided in this embodiment of the present invention may include any one of the following manners:

Manner 1: The request for decrypting the second intermediate encrypted data C1" carries the second intermediate encrypted data C1", and the key management center directly acquires the second intermediate encrypted data C1" carried in the request for decrypting the second intermediate encrypted data C1".

Manner 2: The request for decrypting the second intermediate encrypted data C1" does not carry the second intermediate encrypted data C1", and the key management center receives the request for decrypting the second intermediate encrypted data C1" sent by the second terminal, and sends an instruction for acquiring the second intermediate encrypted data C1" to the second terminal, so as to instruct the second terminal to send the second intermediate encrypted data C1" to the key management center.

S609: The key management center authenticates the second terminal, and if the authentication succeeds, performs step S610.

S610: The key management center decrypts the second intermediate encrypted data C1" according to the key K, so as to obtain encrypted data C2, that is, C2=E(Kb,M).

S611: The key management center sends the encrypted data C2 to the second terminal.

S612: The second terminal decrypts the encrypted data C2 according to a key owned by the second terminal, so as to obtain the original data M, where in this embodiment, the second terminal uses the exchangeable encryption algorithm to decrypt the encrypted data C2 according to the key Kb owned by the second terminal, so as to obtain the original data M.

In the fifth method embodiment provided in the embodiment of the present invention, a key management center encrypts original data M and stores, in the key management center, a key for encrypting the original data M; and when receiving a request for decrypting data or a request for downloading data sent by a second terminal, the key management center does not directly provide an encryption key of encrypted data C1 stored in a cloud server for the second terminal but sends encrypted data C2 that is obtained by processing the encrypted data C1 to the second terminal. The method may not only ensure that the second terminal can obtain the original data M finally according to a key owned by the second terminal, but also ensure that a key of the encrypted data C1 stored in the cloud server may not be leaked during a process where the second terminal acquires cloud data, thereby reducing a risk of key leakage and enhancing security of data sharing. Secondly, after receiving the encrypted data C1 stored in the cloud server, the second terminal encrypts the encrypted data C1 according to a key Kb generated by the second terminal and sends the encrypted data C1' that is obtained after encryption to the key management center, so that data is still encrypted after the key management center decrypts the encrypted data C1'. In this way, data is encrypted during an entire transmission and processing process, thereby enhancing security of data sharing.

Figure 7:
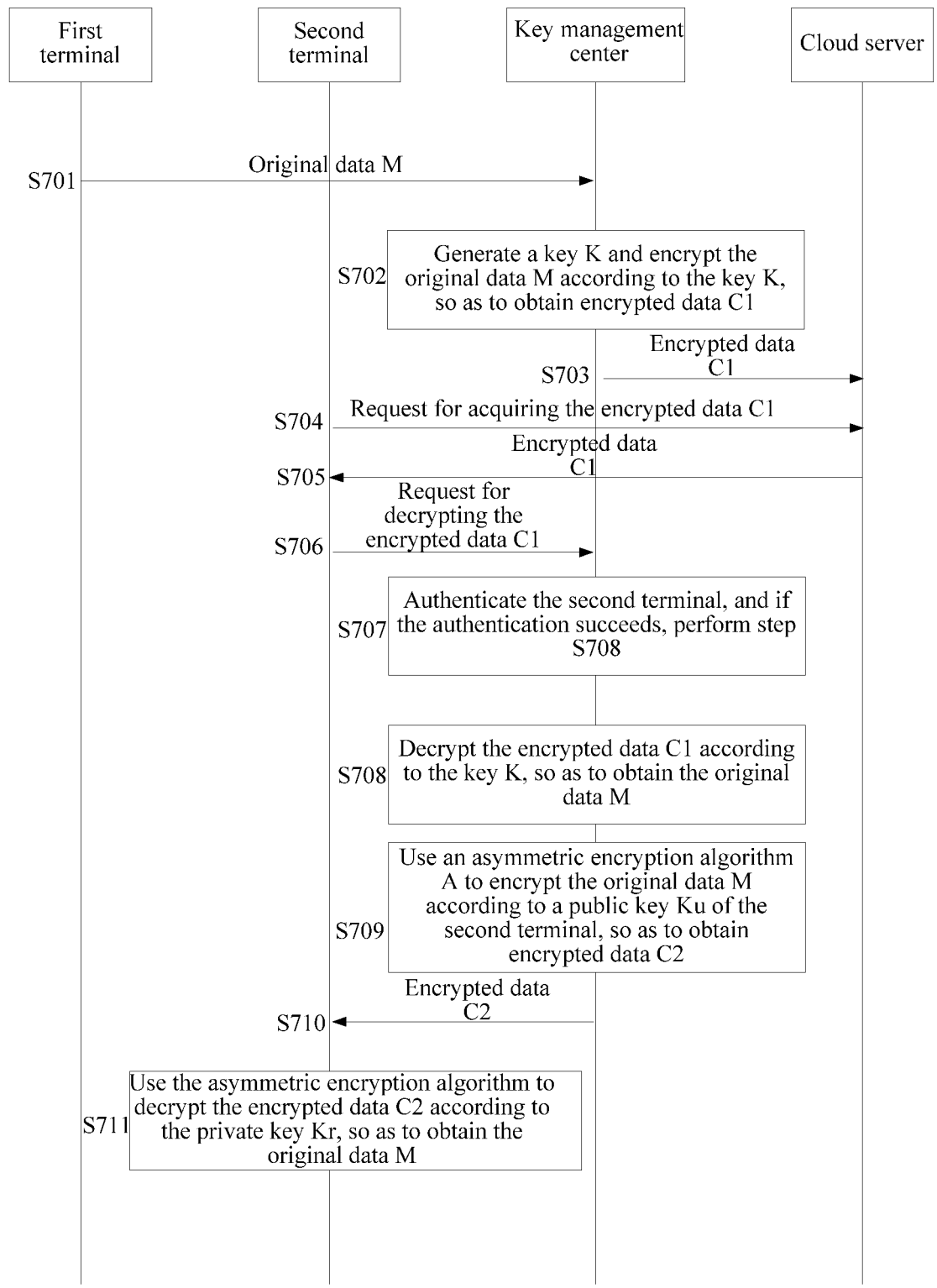
FIG. 7 is an implementation flowchart of a sixth method embodiment under the networking architecture shown in FIG. 1 according to an embodiment of the present invention.

FIG. 7 is an implementation flowchart of a sixth method embodiment under the networking architecture shown in FIG. 1 according to an embodiment of the present invention. This embodiment includes:

S701: A key management center receives original data M sent by a first terminal.

S702: The key management center encrypts the original data M according to a key K generated by the key management center, so as to obtain encrypted data C1.

It should be noted that the key K is generated and stored by the key management center and the key management center does not send the key K to any terminal, including the first terminal, thereby ensuring that the key of the encrypted data is secure.

In this embodiment, the key management center uses an encryption algorithm that can decrypt the encrypted data C1 according to the key K, where the encryption algorithm includes but is not limited to an exchangeable encryption algorithm or a symmetric encryption algorithm.

The symmetric encryption algorithm has the following property:

A key required for decryption is the same as that for encryption.

S703: The key management center uploads the encrypted data C1 to a cloud server for storage.

S704: When a second terminal needs to obtain the original data M, the second terminal sends a request for acquiring the encrypted data C1 to the cloud server, so as to request acquiring of the encrypted data C1.

S705: The second terminal receives the encrypted data C1 returned by the cloud server.

It should be noted that the second terminal may also acquire the encrypted data C1 by using the following manner:

sending, by the second terminal, a request for acquiring the encrypted data C1 to the key management center, and after the key management center downloads the encrypted data C1 from the cloud server according to the request for acquiring the encrypted data C1, receiving the encrypted data C1 sent by the key management center.

S706: The second terminal sends a request for decrypting data to the key management center, where in this embodiment, the request for decrypting data is a request for decrypting the encrypted data C1, and the key management center obtains the encrypted data C1.

A manner for the key management center to obtain the encrypted data C1 provided in this embodiment of the present invention may include any one of the following manners:

Manner 1: The request for decrypting the encrypted data C1 carries the encrypted data C1, and the key management center directly acquires the encrypted data C1 carried in the request for decrypting the encrypted data C1 sent by the second terminal.

Manner 2: The request for decrypting the encrypted data C1 does not carry the encrypted data C1, and the key management center receives the request for decrypting the encrypted data C1 sent by the second terminal, and sends an instruction for acquiring the encrypted data C1 to the second terminal, so as to instruct the second terminal to send the encrypted data C1 to the key management center.

Definitely, when the request for decrypting the encrypted data C1 does not carry the encrypted data C1, after receiving the request for decrypting the encrypted data C1, the key management center may also make a request for acquiring the encrypted data C1 to the cloud server, which is not described herein in further detail in this embodiment.

S707: The key management center authenticates the second terminal, and if the authentication succeeds, performs step S708.

S708: The key management center decrypts the encrypted data C1 according to the key K generated by the key management center, so as to obtain the original data M.

S709: The key management center uses an asymmetric encryption algorithm A to encrypt the original data M according to a public key Ku of the second terminal, so as to obtain encrypted data C2, that is, C2=A(Ku,M).

It should be noted that the public key of the second terminal is an unclassified content. Any other entity, including a server, a key management center, and another terminal, may obtain the public key of the second terminal. After any other entity uses the public key Ku of the second terminal to encrypt data, the data can be decrypted only according to a private key of the second terminal.

The asymmetric encryption algorithm has the following property:

A public key is used for encryption and a private key corresponding to the public key is used for decryption.

S710: The key management center sends the encrypted data C2 to the second terminal.

S711: The second terminal decrypts the encrypted data C2 according to a key owned by the second terminal, so as to obtain the original data M, where in this embodiment, the second terminal uses the asymmetric encryption algorithm to decrypt the encrypted data C2 according to a private key Kr of the second terminal, so as to obtain the original data M; and the second terminal determines an encryption algorithm and a corresponding key that are used when the key management center obtains the encrypted data C2, and decrypts the encrypted data C2 according to the determined encryption algorithm and key, so as to obtain the original data M.

A manner for the second terminal to determine the encryption algorithm and the corresponding key that are used when the key management center obtains the encrypted data C2 provided in this embodiment of the present invention may include but is not limited to any one of the following manners:

Manner 1: The encryption algorithm and the corresponding key that are used for encrypting the encrypted data C2 are obtained after the key management center negotiates with the second terminal in advance.

Manner 2: When sending the encrypted data C2 to the second terminal, the key management center carries an instruction of the encryption algorithm used for obtaining the encrypted data C2, and the second terminal determines, according to the instruction of the encryption algorithm, the encryption algorithm and the corresponding key that are used for obtaining the encrypted data C2.

In this embodiment, the second terminal determines that the key management center uses the asymmetric encryption algorithm A to obtain the encrypted data C2 according to the public key Ku of the second terminal, and uses the asymmetric encryption algorithm A to decrypt the encrypted data C2 according to the private key Kr of the second terminal, so as to obtain the original data M.

In this embodiment, the manner for the key management center to obtain the encrypted data C1 may further include:

when the second terminal needs to acquire the original data M, sending, by the second terminal, a request for downloading data to the key management center, so as to request downloading of the encrypted data C1, where the request for downloading data includes a request for downloading the original data M or a request for downloading the encrypted data C1; and after receiving the request for downloading data, the key management center obtains the encrypted data C1 from the cloud server. Reference is made to the manner described in the fourth embodiment, which is not described herein in further detail.

In the sixth method embodiment provided in the embodiment of the present invention, a key management center encrypts original data M and stores, in the key management center, a key for encrypting the original data M; and when receiving a request for decrypting data or a request for downloading data sent by a second terminal, the key management center does not directly provide an encryption key of encrypted data C1 stored in a cloud server for the second terminal but sends encrypted data C2 that is obtained by processing the encrypted data C1 to the second terminal. The method may not only ensure that the second terminal can obtain the original data M finally according to a key owned by the second terminal, but also ensure that a key of the encrypted data C1 stored in the cloud server may not be leaked during a process where the second terminal acquires cloud data, thereby reducing a risk of key leakage and enhancing security of data sharing. Secondly, after decrypting the encrypted data C1 to obtain the original data M, the key management center encrypts the original data M according to a public key of the second terminal, so that a process where the key management center transmits data to the second terminal is secure.

Figure 8:
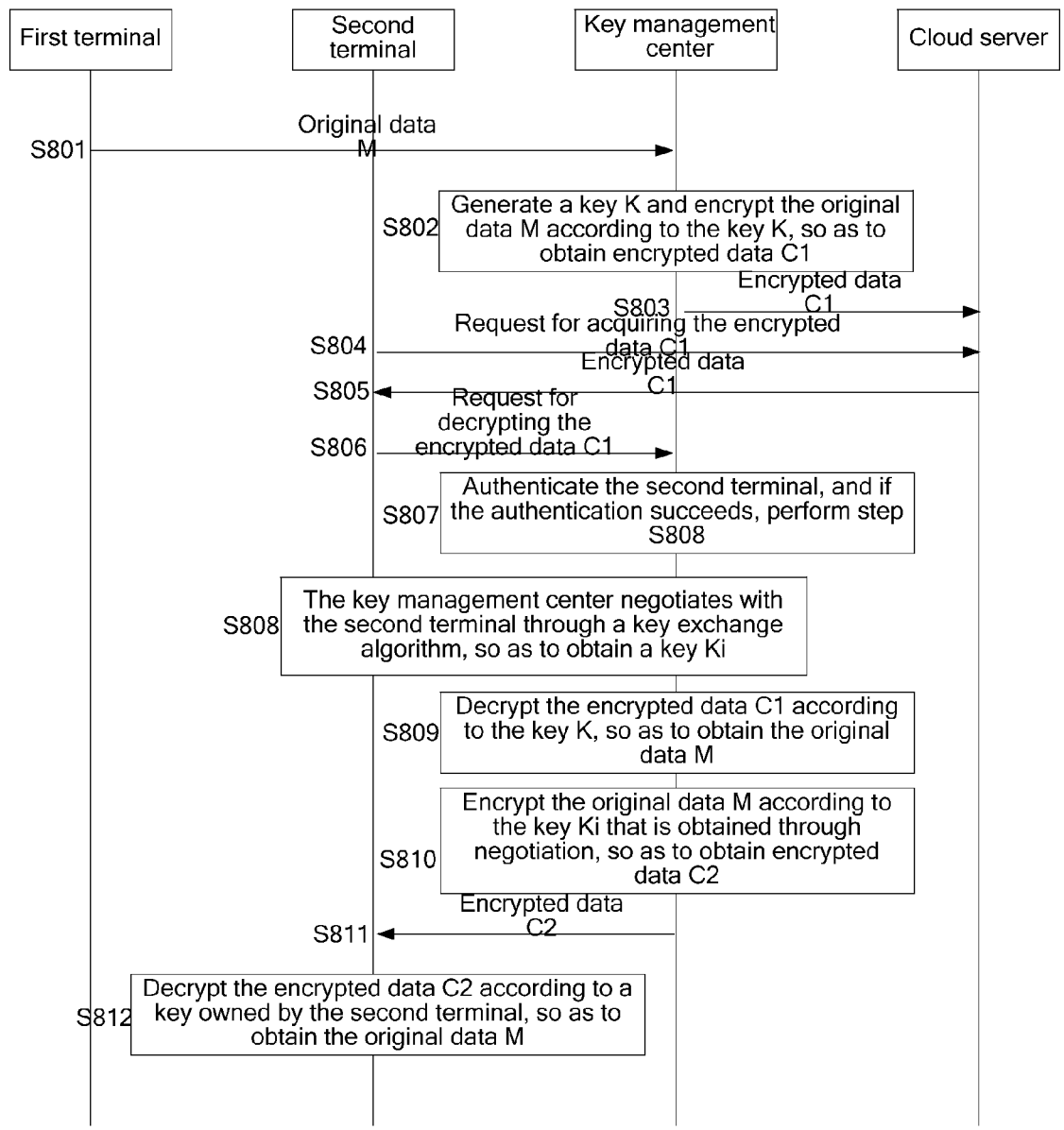
FIG. 8 is an implementation flowchart of a seventh method embodiment under the networking architecture shown in FIG. 1 according to an embodiment of the present invention.

FIG. 8 is an implementation flowchart of a seventh method embodiment under the networking architecture shown in FIG. 1 according to an embodiment of the present invention. This embodiment includes:

S801: A key management center receives original data M sent by a first terminal.

S802: The key management center encrypts the original data M according to a key K generated by the key management center, so as to obtain encrypted data C1

It should be noted that the key K is generated and stored by the key management center and the key management center does not send the key K to any terminal, including the first terminal, thereby ensuring that the key of the encrypted data is secure.

In this embodiment, the key management center uses an encryption algorithm that can decrypt the encrypted data C1 according to the key K, where the encryption algorithm includes but is not limited to an exchangeable encryption algorithm or a symmetric encryption algorithm.

S803: The key management center uploads the encrypted data C1 to a cloud server for storage.

S804: When a second terminal needs to obtain the original data M, the second terminal sends a request for acquiring the encrypted data C1 to the cloud server, so as to request downloading of the encrypted data C1.

S805: The second terminal receives the encrypted data C1 returned by the cloud server.

It should be noted that the second terminal may also acquire the encrypted data C1 by using the following manner:

sending, by the second terminal, a request for acquiring the encrypted data C1 to the key management center, and after the key management center downloads the encrypted data C1 from the cloud server according to the request for acquiring the encrypted data C1, receiving the encrypted data C1 sent by the key management center.

S806: The second terminal sends a request for decrypting data to the key management center, where in this embodiment, the request for decrypting data is a request for decrypting the encrypted data C1, and the key management center obtains the encrypted data C1.

A manner for the key management center to obtain the encrypted data C1 provided in this embodiment of the present invention may include any one of the following manners:

Manner 1: The request for decrypting the encrypted data C1 carries the encrypted data C1, and the key management center directly acquires the encrypted data C1 carried in the request for decrypting the encrypted data C1 sent by the second terminal.

Manner 2: The request for decrypting the encrypted data C1 does not carry the encrypted data C1, and the key management center receives the request for decrypting the encrypted data C1 sent by the second terminal, and sends an instruction for acquiring the encrypted data C1 to the second terminal, so as to instruct the second terminal to send the encrypted data C1 to the key management center.

Definitely, when the request for decrypting the encrypted data C1 does not carry the encrypted data C1, after receiving the request for decrypting the encrypted data C1, the key management center may also make a request for acquiring the encrypted data C1 to the cloud server, which is not described herein in further detail in this embodiment.

S807: The key management center authenticates the second terminal, and if the authentication succeeds, performs step S808.

S808: The key management center negotiates with the second terminal through a key exchange algorithm, so as to obtain a key Ki.

S809: The key management center decrypts the encrypted data C1 according to the key K generated by the key management center, so as to obtain the original data M.

It should be noted that step S809 may also be performed before step S808.

S810: The key management center encrypts the original data M according to the key Ki that is obtained through negotiation, so as to obtain encrypted data C2.

In this embodiment, the key management center uses an encryption algorithm that can decrypt the encrypted data C2 according to the key Ki, where the encryption algorithm includes but is not limited to a symmetric encryption algorithm S or an exchangeable encryption algorithm E.

S811: The key management center sends the encrypted data C2 to the second terminal.

S812: The second terminal decrypts the encrypted data C2 according to a key owned by the second terminal, so as to obtain the original data M; and the second terminal determines an encryption algorithm and a corresponding key that are used when the key management center obtains the encrypted data C2, and decrypts the encrypted data C2 according to the determined encryption algorithm and key, so as to obtain the original data M.

A manner for the second terminal to determine the encryption algorithm and the corresponding key that are used when the key management center obtains the encrypted data C2 provided in this embodiment of the present invention may include but is not limited to any one of the following manners:

Manner 1: The encryption algorithm and the corresponding key that are used for encrypting the encrypted data C2 are obtained after the key management center negotiations with the second terminal in advance.

Manner 2: When sending the encrypted data C2 to the second terminal, the key management center carries an instruction of the encryption algorithm used for obtaining the encrypted data C2, and the second terminal determines, according to the instruction of the encryption algorithm, the encryption algorithm and the corresponding key that are used for obtaining the encrypted data C2.

A manner for the second terminal to decrypt the encrypted data C2 to obtain the original data M may include but is not limited to any one of the following manners:

Manner 1: If it is determined that the encrypted data C2 is obtained after the key management center decrypts the encrypted data C1 to obtain the original data M and then uses the symmetric encryption algorithm S to encrypt the original data M according to the key Ki, the second terminal uses the symmetric encryption algorithm S to decrypt the encrypted data C2 according to the key Ki, so as to obtain the original data M;

Manner 2: If it is determined that the encrypted data C2 is obtained after the key management center decrypts the encrypted data C1 to obtain the original data M and uses the exchangeable encryption algorithm E to encrypt the original data M according to the key Ki, the second terminal uses the exchangeable encryption algorithm E to decrypt the encrypted data C2 according to the key Ki, so as to obtain the original data M.

In this embodiment, the manner for the key management center to obtain the encrypted data C1 may further include:

when the second terminal needs to acquire the original data M, sending, by the second terminal, a request for downloading data to the key management center, so as to request downloading of the encrypted data C1, where the request for downloading data includes a request for downloading the original data M or a request for downloading the encrypted data C1; and after receiving the request for downloading data, the key management center obtains the encrypted data C1 from the cloud server. Reference is made to the manner described in the fourth embodiment, which is not described herein in further detail.

In the seventh method embodiment provided in the embodiment of the present invention, a key management center encrypts original data M and stores, in the key management center, a key for encrypting the original data M; and when receiving a request for decrypting data or a request for downloading data sent by a second terminal, the key management center does not directly provide an encryption key of encrypted data C1 stored in a cloud server for the second terminal but sends encrypted data C2 that is obtained by processing the encrypted data C1 to the second terminal. The method may not only ensure that the second terminal can obtain the original data M finally according to a key owned by the second terminal, but also ensure that a key of the encrypted data C1 stored in the cloud server may not be leaked during a process where the second terminal acquires cloud data, thereby reducing a risk of key leakage and enhancing security of data sharing. Secondly, after decrypting the encrypted data C1 to obtain the original data, the key management center encrypts the original data according to a key Ki that is obtained through key exchange algorithm negotiation between the key management center and the second terminal and an encryption algorithm that is notified by the key management center to the second terminal during a negotiation process, so that a process where the key management center transmits data to the second terminal is secure.

Figure 9:
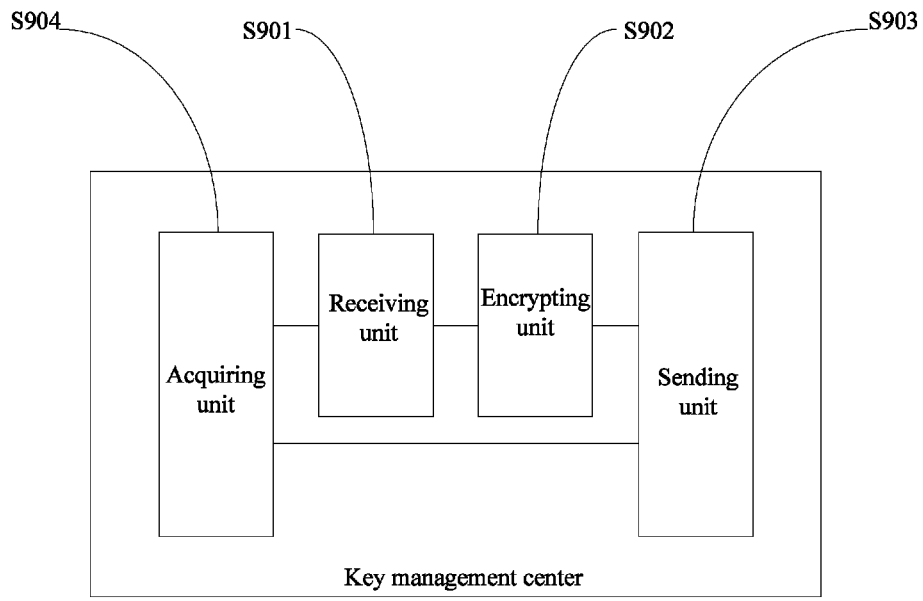
FIG. 9 shows a key management center according to an embodiment of the present invention.

FIG. 9 shows a key management center according to an embodiment of the present invention. The key management center includes:

a receiving unit 901, configured to receive original data M sent by a first terminal and receive a request for decrypting data or a request for downloading data sent by a second terminal;

an encrypting unit 902, configured to encrypt, according to a key K generated by the key management center, the original data M received by the receiving unit 901, so as to obtain encrypted data C1;

a sending unit 903, configured to upload the encrypted data C1 obtained by the encrypting unit 902 to a cloud server for storage; and an obtaining unit 904, configured to obtain encrypted data C2 when the receiving unit 901 receives the request for decrypting data or the request for downloading data sent by the second terminal, where the encrypted data C2 is obtained by processing the encrypted data C1.

The sending unit 903 is further configured to send the encrypted data C2 obtained by the obtaining unit 904 to the second terminal, so that the second terminal decrypts the encrypted data C2 according to a key owned by the second terminal, so as to obtain the original data M.

The obtaining unit 904 includes:

a first obtaining unit, configured to, when the receiving unit 901 receives a request for decrypting the encrypted data C1, a request for downloading the original data M, or a request for downloading the encrypted data C1 sent by the second terminal, obtain the encrypted data C1, firstly encrypt the encrypted data C1 to obtain first intermediate encrypted data C1', and then decrypt the first intermediate encrypted data C1' to obtain the encrypted data C2; or a second obtaining unit, configured to, when the receiving unit 901 receives a request for decrypting second intermediate encrypted data C1" sent by the second terminal, obtain the second intermediate encryption data C1" and decrypt the second intermediate encrypted data C1" to obtain the encrypted data C2, where the second intermediate encrypted data C1" is obtained after the second terminal encrypts the encrypted data C1; or a third obtaining unit, configured to, when the receiving unit 901 receives a request for decrypting the encrypted data C1, a request for downloading the original data M, or a request for downloading the encrypted data C1 sent by the second terminal, obtain the encrypted data C1, firstly decrypt the encrypted data C1 according to the key K to obtain the original data M, and then encrypt the original data M to obtain the encrypted data C2.

The first obtaining unit provided in this embodiment includes:

a first encrypted data obtaining subunit, configured to, when the receiving unit 901 receives the request for decrypting the encrypted data C1 sent by the second terminal, directly acquire the encrypted data C1 carried in the request for decrypting the encrypted data C1 sent by the second terminal; or when the receiving unit 901 receives the request for decrypting the encrypted data C1, obtain the encrypted data C1 from the second terminal; or when the receiving unit 901 receives the request for downloading the original data M or the request for downloading the encrypted data C1, obtain the encrypted data C1 from the cloud server;

a first encryption processing subunit, configured to, if the encrypted data C1 obtained by the first encrypted data obtaining subunit is obtained by using an exchangeable encryption algorithm E to encrypt the encrypted data C1 according to a key Ki, so as to obtain the first intermediate encrypted data C1', where the key Ki is obtained after the key management center negotiates with the second terminal through a key exchange algorithm; and a first decryption processing subunit, configured to decrypt, according to the key K, the first immediate encrypted data C1' obtained by the first encryption processing subunit, so as to obtain the encrypted data C2.

The second obtaining unit provided in this embodiment includes:

a second encrypted data obtaining subunit, configured to, when the first receiving unit 901 receives the request for decrypting the second intermediate encrypted data C1" sent by the second terminal, directly acquire the second intermediate encrypted data C1" carried in the request for decrypting the second intermediate encrypted data C1" sent by the second terminal; or when the receiving unit 901 receives the request for decrypting the second intermediate encrypted data C1" sent by the second terminal, obtain the second intermediate encrypted data C1" from the second terminal, where if the encrypted data C1 is obtained by using the exchangeable encryption algorithm E, the second intermediate encrypted data C1" is obtained after the second terminal uses the exchangeable encryption algorithm E to encrypt the encrypted data C1 according to a key Kb of the second terminal; and a second decryption processing subunit, configured to decrypt, according to the key K, the second intermediate encrypted data C1" obtained by the second encrypted data obtaining subunit, so as to obtain the encrypted data C2.

The third obtaining unit provided in this embodiment includes:

a third encrypted data obtaining subunit, configured to, when the receiving unit 901 receives the request for decrypting the encrypted data C1 sent by the second terminal, directly acquire the encrypted data C1 carried in the request for decrypting the encrypted data C1 sent by the second terminal; or when the receiving unit 901 receives the request for decrypting the encrypted data C1, obtain the encrypted data C1 from the second terminal; or when the receiving unit 901 receives the request for downloading the original data M or the request for downloading the encrypted data C1, obtain the encrypted data C1 from the cloud server;

a third decryption processing subunit, configured to decrypt, according to the key K, the encrypted data C1 obtained by the third encrypted data obtaining subunit, so as to obtain the original data M; and a third encryption processing subunit, configured to use an asymmetric encryption algorithm A to encrypt, according to a public key Ku of the second terminal, the original data M obtained by the third decryption processing subunit, so as to obtain the encrypted data C2; or configured to use a symmetric encryption algorithm S or an exchangeable encryption algorithm E to encrypt, according to a key Ki, the original data M obtained by the third decryption processing subunit, so as to obtain the encrypted data C2, where the key Ki is obtained after the key management center negotiates with the second terminal through a key exchange algorithm.

With the key management center provided in this embodiment, an encrypting unit encrypts original data M received by a receiving unit and uploads encrypted data C1 that is obtained after encryption to a cloud server for storage through a sending unit; and when a second terminal needs to acquire the original data M, the sending unit does not directly send an encryption key of the encrypted data C1 stored in the cloud server to the second terminal but sends encrypted data C2 that is obtained by an obtaining unit by processing the encrypted data C1. The method may not only ensure that the second terminal can decrypt the encrypted data C2 according to a key owned by the second terminal, so as to obtain the original data M, but also ensure that a key of the encrypted data C1 stored in the cloud server may not be leaked during a process where the second terminal acquires encrypted data, thereby reducing a risk of key leakage and enhancing security of data sharing. Secondly, the obtaining unit of the key management center obtains the encrypted data C2 by firstly encrypting the received encrypted data C1 to obtain first intermediate encrypted data C1' and then decrypting the first intermediate encrypted data C1'; or obtains the encrypted data C2 by decrypting second intermediate encrypted data C1" sent by the second terminal. In this way, data is encrypted during an entire transmission and processing process, thereby enhancing security of data sharing.

Figure 10:
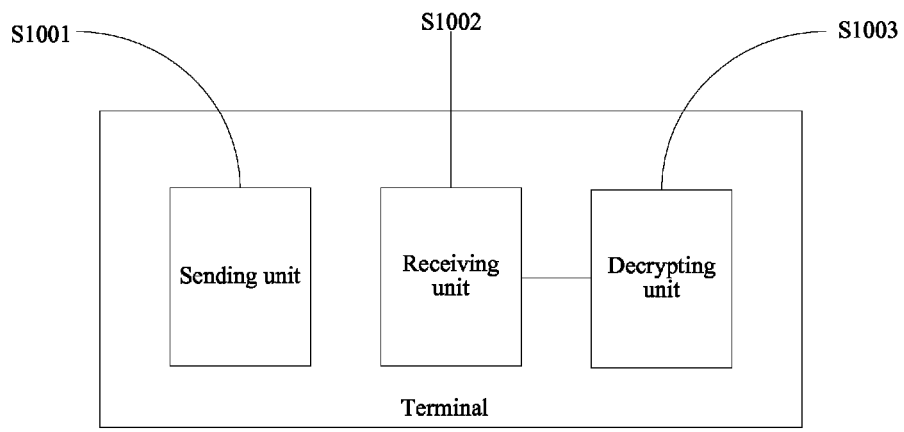
FIG. 10 shows a terminal according to an embodiment of the present invention.

As shown in FIG. 10, an embodiment of the present invention provides a terminal, including:

a sending unit 1001, configured to send a request for decrypting data or a request for downloading data to a key management center;

a receiving unit 1002, configured to receive encrypted data C2 sent by the key management center, where the encrypted data C2 is obtained by processing encrypted data C1, the encrypted data C1 is data stored in a cloud server, and the encrypted data C1 is obtained after the key management center encrypts, according to a key K generated by the key management center, original data M sent by a first terminal; and a decrypting unit 1003, configured to decrypt, according to a key owned by the terminal, the encrypted data C2 received by the receiving unit 1002, so as to obtain the original data M.

In a specific implementation manner of this embodiment of the present invention, the sending unit 1001 is specifically configured to send a request for decrypting the encrypted data C1, a request for downloading the original data M, or a request for downloading the encrypted data C1 to the key management center.

The receiving unit 1002 includes:

a first receiving unit, configured to receive the encrypted data C2 sent by the key management center, where if the encrypted data C1 is obtained by using an exchangeable encryption algorithm E, the key management center uses the exchangeable encryption algorithm E to encrypt the encrypted data C1 according to a key Ki, so as to obtain first intermediate encrypted data C1', and decrypts the first intermediate encrypted data C1' according to the key K, so as to obtain the encrypted data C2, where the key Ki is obtained after the key management center negotiates with the second terminal through a key exchange algorithm; or a second receiving unit, configured to receive the encrypted data C2 sent by the key management center, where the key management center decrypts the encrypted data C1 according to the key K, so as to obtain the original data M, and uses an asymmetric encryption algorithm A to encrypt the original data M according to a public key Ku of the second terminal, so as to obtain the encrypted data C2; or a third receiving unit, configured to receive the encrypted data C2 sent by the key management center, where the key management center decrypts the encrypted data C1 according to the key K, so as to obtain the original data M, and uses a symmetric encryption algorithm S or an exchangeable encryption algorithm E to encrypt the original data M according to a key Ki, so as to obtain the encrypted data C2. The decrypting unit 1003 includes:

a first decrypting unit, configured to, if the encrypted data C2 received by the receiving unit 1002 is obtained after the key management center decrypts the first intermediate encrypted data C1', use the exchangeable encryption algorithm to decrypt the encrypted data C2 according to the key Ki owned by the terminal, so as to obtain the original data M; or a second decrypting unit, configured to, if the encrypted data C2 received by the receiving unit 1002 is obtained after the key management center decrypts the encrypted data C1 to obtain the original data M and then uses the asymmetric encryption algorithm to encrypt the original data M according to the public key of the terminal, use the asymmetric encryption algorithm to decrypt the encrypted data C2 according to the private key Kr of the terminal, so as to obtain the original data M; or a third decrypting unit, configured to, if the encrypted data C2 received by the receiving unit 1002 is obtained after the key management center decrypts the encrypted data C1 to obtain the original data M and then uses the symmetric encryption algorithm S or the exchangeable encryption algorithm E to encrypt the original data M according to the key Ki, use the symmetric encryption algorithm S or the exchangeable encryption algorithm E to decrypt the encrypted data C2 according to the key Ki owned by the terminal, so as to obtain the original data M.

With the terminal provided in this embodiment of the present invention, when requesting acquiring of original data M, a receiving unit does not directly receive an encryption key of encrypted data C1 stored in a cloud server but receives encrypted data C2 that is obtained by processing the encrypted data C1. The method may not only ensure that a second terminal can decrypt the encrypted data C2 according to a key owned by the second terminal, so as to obtain the original data M, but also ensure that a key of the encrypted data C1 stored in the cloud server may not be leaked during a process where the second terminal acquires encrypted data, thereby reducing a risk of key leakage and enhancing security of data sharing.

Figure 11:
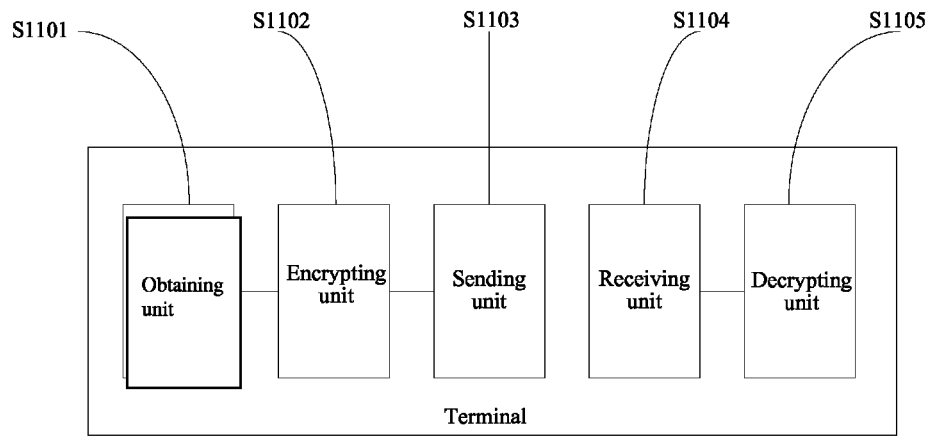
FIG. 11 shows another terminal according to an embodiment of the present invention.

As shown in FIG. 11, an embodiment of the present invention provides a terminal, including:

an obtaining unit 1101, configured to obtain encrypted data C1, where the encrypted data C1 is data stored in a cloud server and the encrypted data C1 is obtained after a key management center encrypts, according to a key K generated by the key management center, original data M sent by a first terminal;

an encrypting unit 1102, configured to, if the encrypted data C1 obtained by the obtaining unit 1101 is obtained after encryption is performed by using an exchangeable encryption algorithm, use the exchangeable encryption algorithm to encrypt the obtained encrypted data C1 according to a key Kb of the terminal, so as to obtain second intermediate encrypted data C1";

a sending unit 1103, configured to send a request for decrypting data or a request for downloading data to the key management center, where in this embodiment, the sending unit 1103 is specifically configured to send a request for decrypting the second intermediate encrypted data C1" to the key management center after the encrypting unit 1102 obtains the second intermediate encrypted data C1";

a receiving unit 1104, configured to receive encrypted C2 sent by the key management center, where the encrypted data C2 is obtained by processing the encrypted data C1, and in this embodiment, the key management center decrypts the second intermediate encrypted data C1" according to the key K, so as to obtain the encrypted data C2; and a decrypting unit 1105, configured to decrypt, according to a key owned by the terminal, the encrypted data C2 received by the receiving unit 1104, so as to obtain the original data M, where in this embodiment, the decrypting unit 1105 is specifically configured to use the exchangeable encryption algorithm E to decrypt the encrypted data C2 according to a key Kb of the terminal, so as to obtain the original data.

With the terminal provided in this embodiment of the present invention, when requesting acquiring of original data M, a receiving unit does not directly receive an encryption key of encrypted data C1 stored in a cloud server but receives encrypted data C2 that is obtained by processing encrypted data C1. The method may not only ensure that a second terminal can decrypt the encrypted data C2 according to a key owned by the second terminal, so as to obtain the original data M, but also ensure that a key of the encrypted data C1 stored in the cloud server may not be leaked during a process where the second terminal acquires encrypted data, thereby reducing a risk of key leakage and enhancing security of data sharing. Secondly, after obtaining the encrypted data C1, the second terminal firstly encrypts the encrypted data C1, so that data decrypted by a key management center is still encrypted. In this way, data is encrypted during an entire transmission and processing process, thereby enhancing security of data sharing.

Figure 12:
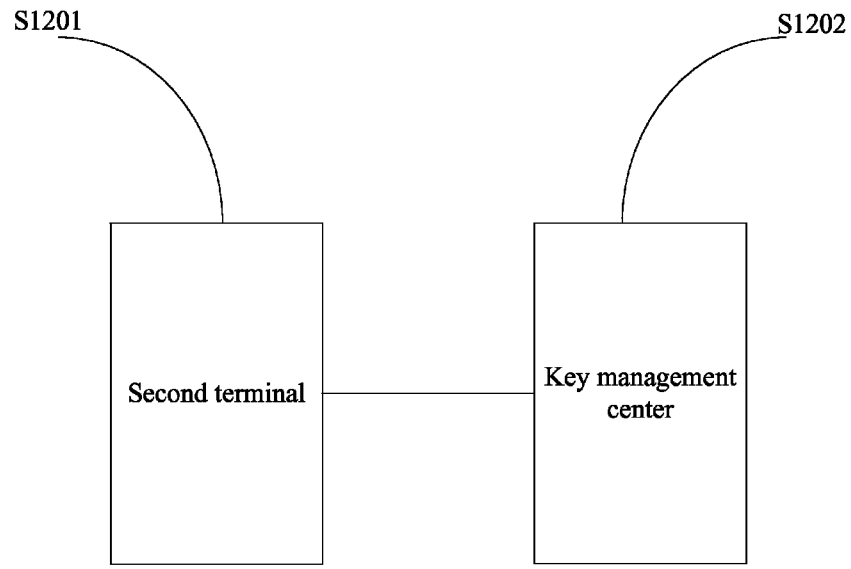
FIG. 12 shows a system for protecting cloud data security according to an embodiment of the present invention.

FIG. 12 shows a system for protecting cloud data security according to an embodiment of the present invention. The system includes:

a second terminal 1201, configured to, after sending a request for decrypting data or a request for downloading data to a key management center 1202, receive encrypted data C2 sent by the key management center and decrypt the encrypted data C2 according to a key owned by the second terminal 1201, so as to obtain original data M of a first terminal; and the key management center 1202, configured to, when receiving the request for decrypting data or the request for downloading data sent by the second terminal 1201, obtain the encrypted data C2 and send the encrypted data C2 to the second terminal 1201, where the encrypted data C2 is obtained by processing encrypted data C1, the encrypted data C1 is stored in a cloud server, and the encrypted data is obtained after the key management center 1202 encrypts, according to a key K generated by the key management center 1202, the original data M sent by the first terminal.

In this embodiment, the system may further include:
the first terminal, configured to send the original data M to the key management center.

It should be noted that the first terminal and the second terminal 1201 may be the same terminal.

The second terminal 1201 provided in this embodiment includes:

a sending unit, configured to send the request for decrypting data or the request for downloading data to the key management center 1202;

a receiving unit, configured to receive the encrypted data C2 sent by the key management center 1202; and a decrypting unit, configured to decrypt, according to the key owned by the second terminal 1201, the encrypted data C2 received by the receiving unit, so as to obtain the original data M.

The key management center 1202 provided in this embodiment includes:

a receiving unit, configured to receive the original data M sent by the first terminal and receive the request for decrypting data or the request for downloading data sent by the second terminal 1201;

an encrypting unit, configured to encrypt, according to the key K generated by the key management center 1202, the original data M received by the receiving unit, so as to obtain the encrypted data C1;

a sending unit, configured to upload the encrypted data C1 obtained by the encrypting unit to the cloud server for storage; and an obtaining unit, configured to obtain the encrypted data C2 when the receiving unit receives the request for decrypting data or the request for downloading data sent by the second terminal 1201.

The sending unit is further configured to send the encrypted data C2 obtained by the obtaining unit to the second terminal 1201.

With the method, the apparatus, and the system for protecting cloud data security provided in the embodiments of the present invention, a key management center encrypts original data M and stores, in the key management center, a key for encrypting the original data M; and when receiving a request for decrypting data or a request for downloading data sent by a second terminal, the key management center does not directly provide an encryption key of encrypted data C1 stored in a cloud server for the second terminal but sends encrypted data C2 that is obtained by processing encrypted data C1. The method may not only ensure that the second terminal can obtain the original data M finally according to a key owned by the second terminal, but also ensure that a key of the encrypted data C1 stored in the cloud server may not be leaked during a process where the second terminal acquires cloud data, thereby reducing a risk of key leakage and enhancing security of data sharing. Secondly, the key management center may obtain the encrypted data C2 by using a manner of decryption after encryption, a manner of encryption after decryption, or a manner of decrypting encrypted data C1' sent by the second terminal. In this way, a manner for the key management center to obtain the encrypted data C2 is more diverse. In addition, by using the manner in which the key management center firstly encrypts the encrypted data C1 and decrypts an encryption result or a manner in which firstly the second terminal encrypts the encrypted data C1 and then the key management center decrypts an encryption result of the second terminal, data is encrypted during an entire transmission and processing process, thereby enhancing security of data sharing.

In conclusion, the foregoing descriptions are only exemplary embodiments of the technical solutions of the present invention but are not intended to limit the protection scope of the present invention. Any modification, equivalent replacement, or improvement made within the spirit and principle of the present invention shall all fall within the protection scope of the present invention.

What is claimed is:

1. A method for protecting data security, comprising:
   receiving, by a key management center, original data M sent by a first terminal for storage at a server;
   encrypting, by the key management center, the original data M with a key K by using an exchangeable encryption algorithm E to obtain encrypted data C1;
   uploading, by the key management center, the encrypted data C1 to the server for storage;
   receiving, by the key management center, a request sent by a second terminal for the original data M;
   obtaining, by the key management center, the encrypted data C1;
   encrypting, by the key management center, the encrypted data C1 using a key Ki by using the exchangeable encryption algorithm E to obtain first intermediate encrypted data C1', wherein the key Ki is owned by the second terminal;
   decrypting, by the key management center, the first intermediate encrypted data C1' according to the key K by using the exchangeable encryption algorithm E to obtain encrypted data C2; and
   sending, by the key management center, the encrypted data C2 to the second terminal, so as to instruct the second terminal to decrypt the C2 by using the Ki and the exchangeable encryption algorithm E to obtain the original data M, wherein the exchangeable encryption algorithm E is:
   $E(K1,E(K2,Q))=E(K2,E(K1,Q))$, wherein K1 and K2 are encryption keys, Q is data to be encrypted and a result of encryption by using the exchangeable algorithm does not depend on a sequence of using the keys K1 and K2.

2. The method according to claim 1, further including the step of: obtaining, by the key management center, the key Ki by negotiating with the second terminal through a key exchange algorithm.

3. A method for protecting data security, comprising:
   obtaining, by a network terminal, encrypted data C1 from a storage server, wherein the encrypted data C1 is generated by encrypting original data M with a key K by using an exchangeable encryption algorithm E;
   encrypting, by the network terminal, the encrypted data C1 with a key Kb to by using the exchangeable encryption algorithm E obtain intermediate encrypted data C1", wherein the key Kb is owned by the network terminal;
   sending, by the network terminal, the intermediate encrypted data C1" and a request for decrypting the intermediate encrypted data C1" to a key management center;
   receiving, by the network terminal, encrypted data C2 sent by the key management center, wherein the encrypted data C2 is generated by decrypting the intermediate encrypted data C1" with the key K by using the exchangeable encryption algorithm E; and
   decrypting, by the network terminal, the encrypted data C2 using the key Kb and the exchangeable encryption algorithm E to obtain the original data M, wherein the exchangeable encryption algorithm E is:
   $E(K1,E(K2,Q))=E(K2,E(K1,Q))$, wherein K1 and K2 are encryption keys, Q is data to be encrypted and a result of encryption by using the exchangeable algorithm does not depend on a sequence of using the keys K1 and K2.

4. A key management center for use in a computer network to protect data security, comprising:
   a network interface for communicating over the computer network;
   a hardware processor; and
   a memory storing instructions executable by the processor to perform operations of:
   receiving original data M sent by a first terminal for storage at a server;
   encrypting the original data M according to a key K by using an exchangeable encryption algorithm E to obtain encrypted data C1;
   uploading the encrypted data C1 to the server for storage;
   receiving a request sent by a second terminal for the original data M;
   obtaining the encrypted data C1;

encrypting the encrypted data C1 using a key Ki by using the exchangeable encryption algorithm E to obtain first intermediate encrypted data C1', wherein the key Ki is owned by the second terminal;

decrypting the first intermediate encrypted data C1' using the key K and the exchangeable encryption algorithm E to obtain encrypted data C2; and sending the encrypted data C2 to the second terminal, to instruct the second terminal to decrypt the C2 by using the key Ki and the exchangeable encryption algorithm E to obtain the original data M, wherein the exchangeable encryption algorithm E is:

$E(K1,E(K2,Q))=E(K2,E(K1,Q))$, wherein K1 and K2 are encryption keys, Q is data to be encrypted and a result of encryption by using the exchangeable algorithm does not depend on a sequence of using the keys K1 and K2.

5. The key management center according to claim 4, wherein the instructions which, when executed by the processor, cause the processor to perform an operation of obtaining the key Ki by negotiating with the second terminal through a key exchange algorithm.

6. A network terminal, comprising:
a network interface for communicating over a network;
a processor; and
a memory storing instructions executable by the processor to perform operations of:

obtaining encrypted data C1 from a storage server, wherein the encrypted data C1 is generated by encrypting original data M with a key K by using an exchangeable encryption algorithm E;

encrypting the encrypted data C1 according to a key Kb by using the exchangeable encryption algorithm E to obtain intermediate encrypted data C1", wherein the key Kb is owned by the network terminal;

sending the intermediate encrypted data C1" and a request for decrypting the intermediate encrypted data C1" to a key management center;

receiving encrypted data C2 sent by the key management center, wherein the encrypted data C2 is generated by decrypting the intermediate encrypted data C1" with the key K by using the exchangeable encryption algorithm E; and decrypting the encrypted data C2 using the key Kb and the exchangeable encryption algorithm E to obtain the original data M, wherein the exchangeable encryption algorithm E is:

$E(K1,E(K2,Q))=E(K2,E(K1,Q))$, wherein K1 and K2 are encryption keys, Q is data to be encrypted and a result of encryption by using the exchangeable algorithm does not depend on a sequence of using the keys K1 and K2.

* * * * *